Figure 1:
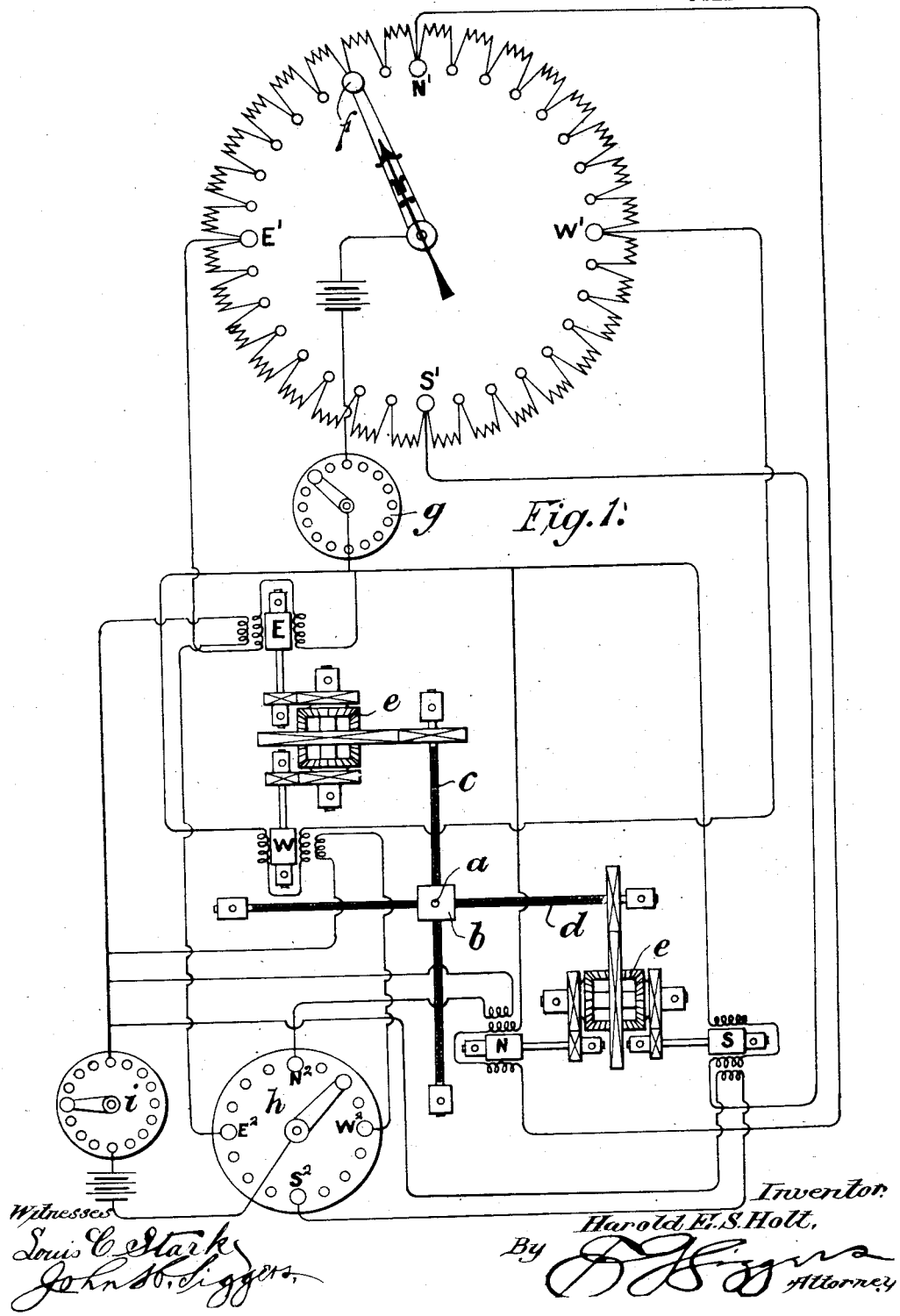

No. 830,718. PATENTED SEPT. 11, 1906.
H. E. S. HOLT.
APPLIANCE FOR TRACING COURSES ON CHARTS.
APPLICATION FILED NOV. 26, 1904.

4 SHEETS—SHEET 1.

No. 830,718. PATENTED SEPT. 11, 1906.
H. E. S. HOLT.
APPLIANCE FOR TRACING COURSES ON CHARTS.
APPLICATION FILED NOV. 26, 1904.
4 SHEETS—SHEET 2.
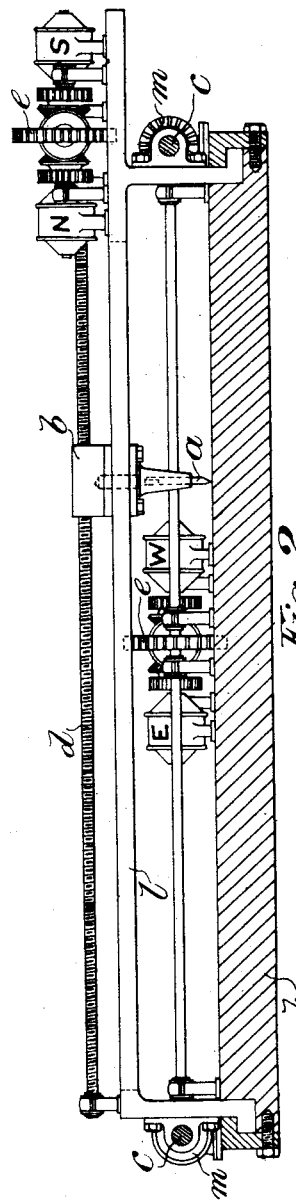
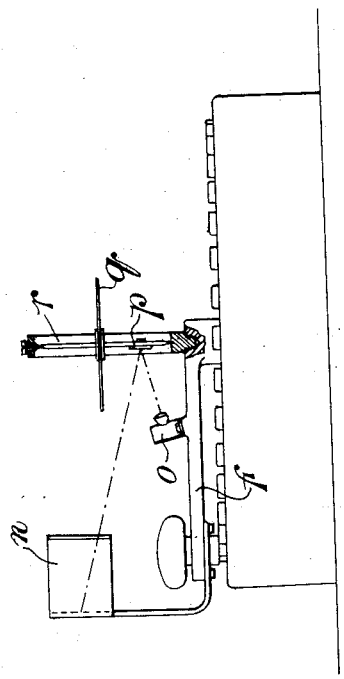
Harold E. S. Holt, Inventor.
By
Witnesses
Attorney.

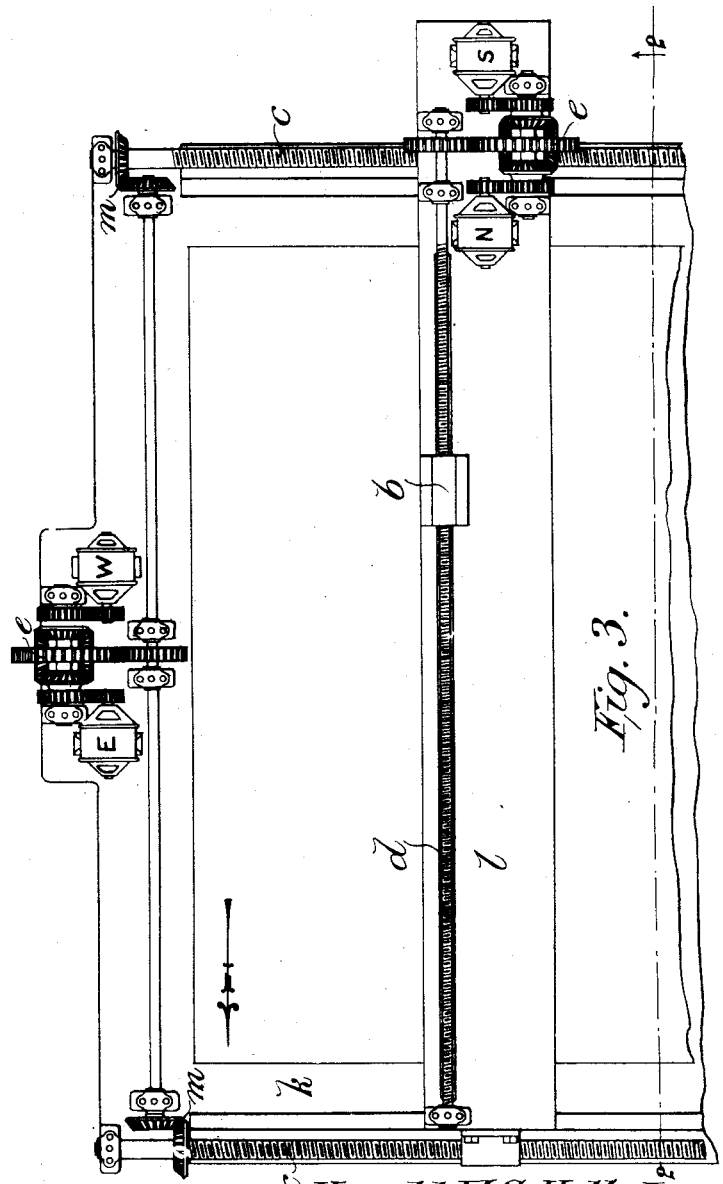

No. 830,718. PATENTED SEPT. 11, 1906.
H. E. S. HOLT.
APPLIANCE FOR TRACING COURSES ON CHARTS.
APPLICATION FILED NOV. 26, 1904.
4 SHEETS—SHEET 4.
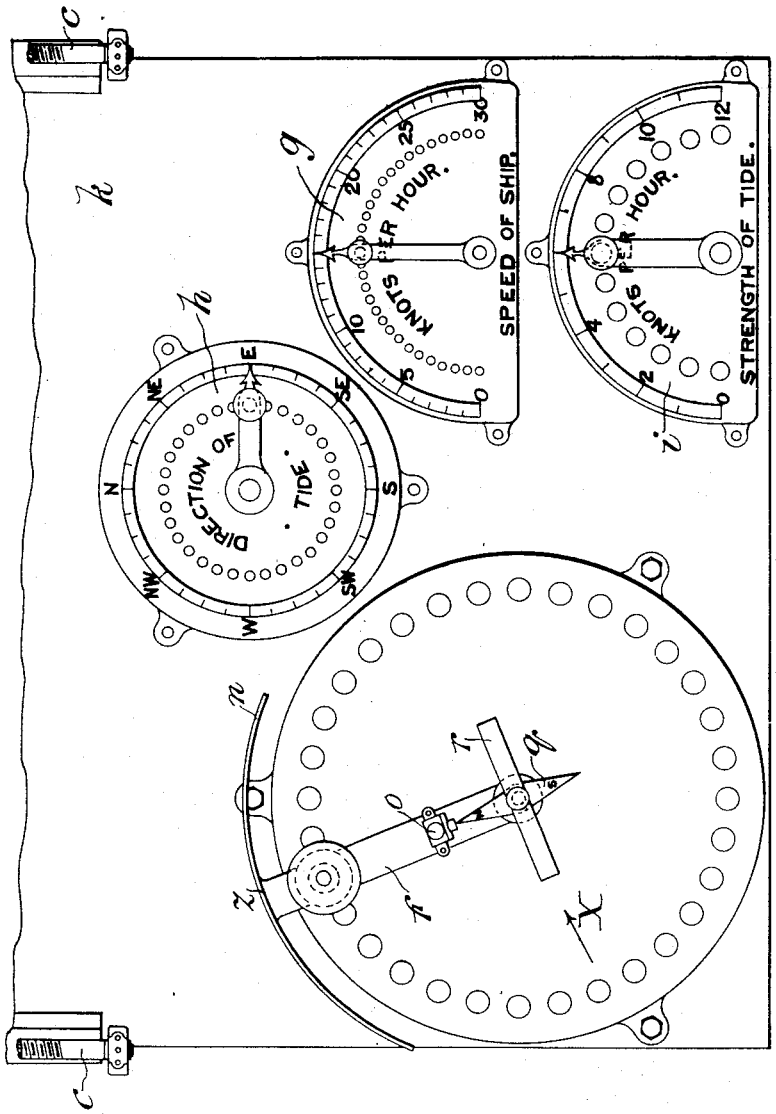
Fig. 3ᵃ.
Harold E. S. Holt, Inventor.

UNITED STATES PATENT OFFICE.

HAROLD EDWARD SHERWIN HOLT, OF FARNBOROUGH, ENGLAND.

APPLIANCE FOR TRACING COURSES ON CHARTS.

No. 830,718.  Specification of Letters Patent.  Patented Sept. 11, 1906.

Application filed November 26, 1904. Serial No. 234,418.

*To all whom it may concern:*

Be it known that I, HAROLD EDWARD SHERWIN HOLT, a subject of the King of Great Britain and Ireland, residing at The Grange, Farnborough, in the county of Hants, England, have invented a certain new and useful Appliance for Tracing Courses on Charts, of which the following is a specification.

This invention relates to an apparatus for automatically tracing on a chart the course of a vessel, or, conversely, if a course is marked on a chart, enabling the vessel to be navigated along such course without the aid of landmarks or lights or without necessitating the usual calculations.

The invention briefly consists in causing an indicating device, such as a pencil or pointer, to move relatively to a chart and in directions corresponding to the course of the vessel, the movements of the pencil or pointer being effected by suitable motive power, such as by electric motors, which not only impart the necessary motion to the pencil, but control the direction taken by it, the power or influence of the various motors being adequately regulated by controllers which are operated according to the direction and speed of the vessel and of prevalent tides, winds, or currents, ascertained by suitable indicators.

In order that the invention may be properly understood, reference will be made to the accompanying drawings, wherein—

Figure 1 is a diagram illustrating the principle of the invention, while Figs. 2, 3, and 3ª illustrate in sectional elevation and plan one practical embodiment of the invention, Figs. 3, 3ª forming one complete view and Fig. 2 being a section on the line 2 2, Fig. 3. Fig. 4 is a detail elevation of the main rheostat and accessory parts.

Referring first to the diagram, Fig. 1, $a$ represents the indicating device, in the form of either a pencil or pointer, which is to be moved over the chart to either indicate or follow the course taken or to be taken by the ship. In order to impart the necessary movement to the pointer, it is influenced by four motors N S E W, each of which is tending to move it in a direction on the chart corresponding to the four cardinal points of the compass. It will thus be understood that if the influence of all the motors is equal at any time the pointer will remain stationary, whereas by varying the influence of any one or more of the motors the direction of travel of the pointer may be altered at will. Any suitable transmitting medium may be employed between the motors and the pointer. In the diagram it is assumed that screws of fine pitch are adopted, one, $c$, driven by the E and W motors through suitable differential gear $e$, and the other, $d$, by the N and S motors, also through suitable differential gear $e$. It will be clear that the speed and direction of rotation of either screw will depend upon whether one or other of the motors of its pair is running the faster, and accordingly as the speeds of the various motors are varied so will the direction and speed of travel of the pointer be varied. Now in order that such travel of the pointer shall correspond with the travel of the ship it is necessary that the speed of the motors shall be controlled by some means regulated in turn according to the direction of the ship's travel, the speed of same, and the speed and direction of any currents, tides, or winds. This may be accomplished by varying the resistances in circuit with the field-windings of the motors. For instance, as indicated in the diagram, Fig. 1, a main rheostat fitted with a contact-arm $f$, and connected at points N' S' E' W' with the respective motors N S E W, is placed in the battery-circuit, and the contact-arm $f$ is moved over the rheostat whenever the course of the ship is altered, so as to always point due N, as indicated by a compass-needle. The rheostat may be graduated and marked off so that the compass-needle directly indicates the direction of the ship's course. For example, suppose the rheostat is so set that a line through N' S' is parallel to the fore-and-aft axis of the ship, then if the ship is turned until the compass-needle is pointing to N' on the rheostat the ship's course will be due north, and if to E' it will be due east, and so on. Since the speed of each motor depends on the resistance in its circuit, and this is varied according to the position of the arm $f$, it will be clear that if the contact-arm $f$ is always moved so as to follow up and coincide with the needle the speed of the respective motors will be proportionately varied, so that the pointer $a$ will travel in a direction corresponding to that of the ship. In order that allowance may be made for variations in the speed of the ship, a second rheostat $g$ is provided in the battery-circuit, so as to affect all the motors equally and similarly. In order to allow for tides, currents, or winds, other rheostats $h$ and $i$ are provided, one, $h$, for the direction of the current, being arranged and connected at points $N^2 S^2 E^2 W^2$ to additional field exciting-coils on the various motors N S E W, and the other, $i$, being a simple rheostat for the speed of the current, ascertained in any convenient manner.

The principle of the invention being described, reference will now be made to Figs. 2 to 3, which illustrate one practical embodiment of the invention. In carrying out the invention according to this form a pointer or pencil $a$ is adapted to travel over a chart placed upon a table $k$, the chart being so placed that the cardinal points indicated on the chart agree with those suitably marked on the table. For instance, in the example shown in Fig. 3ª, a direction from south to north on the chart is made to agree with a direction from right to left of the table, as shown. The pointer $a$ is carried in a holder on a nut or block $b$, through which is threaded a screwed shaft $d$ of fine pitch, the shaft $d$ being driven by motors N S through differential gear $e$ to effect a travel of the pointer $a$ across the chart. The shaft $d$ and its motors are all carried upon a bridge $l$, which is adapted to slide on the table $k$ at right angles to the shaft $d$ under the influence of two screwed shafts $c$, driven by motors E and W through differential gear $e$ and suitable intermediate gearing $m$, the latter being of course arranged so that both shafts $c$ always rotate similarly. The motors E W thus effect a travel of the pointer in a direction at right angles to that effected by the motors N S—that is to say, the motors N S effect the travel of the pointer in a north or south direction on the chart and the motors E W in an east or west direction. By this arrangement, therefore, the pencil or pointer $a$ may be moved in any desired direction by accordingly controlling the speeds of the various motors. These speeds are controlled, as hereinbefore mentioned, according to the speed and direction of the ship and also of any prevalent tides, currents, or winds, this in turn being preferably accomplished also, as hereinbefore mentioned, by regulating the resistances in circuit with the field-windings of the motors. The rheostats for effecting the control are shown, by way of example, arranged on an extension of the chart-table in Fig. 3ª. It is obvious, however, that they may be arranged in any part of the chart-room or vessel. They are indicated by similar letters to those marked on Fig. 1, before referred to. In order to be able to easily and accurately adjust the handle or arm $f$, an arcuate scale $n$ is carried on the end thereof with its zero-mark at the middle point $z$. A lamp $o$, also carried on the arm $f$, throws a spot of light onto a small mirror $p$, which is carried rigidly on the spindle of the magnet-needle $q$. This spot of light is reflected onto the scale $n$, as shown in Fig. 4, which is an elevation of this instrument looking in the direction of the arrow X, Fig. 3ª. The frame $r$, in which the magnet-needle is pivoted, is screwed into the central boss of the arm $f$ and moves with it so that the frame never obstructs the path of the beam of light. When the ship's course is altered, the arm $f$ must be moved round so as to keep the spot of light on the zero-mark on the scale $n$.

It is to be understood that the apparatus above described is only one practical embodiment of the invention and that the details thereof may be considerably modified—for instance, the main rheostat may be independently arranged with regard to the compass—that is to say, the compass-needle, with its mirror, may be arranged to throw a spot of light on a scale arranged around the cabin, preferably near the roof, and the navigating officer in charge of the rheostat can move the handle thereof to correspond with the movements of the spot of light, or the rheostat may be formed on the scale and a small sliding block be made to follow the spot.

To insure a uniform load on the motors and accurate variations of speed proportionate to varying resistances, the motors may be wound as dynamotors (motor-transformers) and the current generated run into a resistance. The object of using the dynamotors is as follows: A wide range of speed is necessary in the motors, as not only has the speed of each motor of the pair to be varied relatively to the other in order to give proper direction to the pencil, but also by another separate variable resistance common to all four motors the speed of all four is varied simultaneously according to the screw revolutions, (or calculated dead-water speed of the ship.) With such wide ranges of speed the friction of the actuating mechanism would vary considerably, and consequently the load on the motors. By winding the motors as "dynamotors" or "motor-transformers" the current from the dynamo portion of the armatures can be run into a fixed resistance, thus giving a steady load. This load should be much greater than the load caused by internal friction, so that the variations of the latter are negligible.

A dynamotor or motor-transformer may be constructed in two ways. Either two separate armatures and commutators may be mounted on one shaft running between two pairs of field-magnets, in which case one armature will run as a motor and the other armature, which will generate current, as a dynamo, or one armature may be wound with two separate circuits and two commutators, one taking current and driving the armature as a motor, while the other generates current as an armature.

To make the apparatus adjustable for charts of different scales, the motors may be connected up through different gear-wheels, or another external resistance may be put in the circuit and varied according to the scale of the chart in use.

The apparatus may, if desired, be used conversely—that is to say, a course may be marked on the chart and the vessel navigated so that the pencil follows this mark, and in consequence the vessel will be following the desired course. In this case it will be necessary for the helmsman to receive orders from the navigating officer in charge of the various rheostats, who will operate the same in the required manner to retain the pointer on the course marked out. He will order the helmsman to steer to port or starboard accordingly as the spot of light on the scale $n$ moves away from the zero-mark as he works the rheostats. He will, in fact, have to see that however he operates the rheostats the ship is steered to maintain the spot of light on the zero-mark—that is, however he may move the rheostat-arm $f$ the ship must be steered to bring that arm in a position pointing due N.

Having thus described my invention, what I claim as new, and desire to secure by Letters Patent, is—

1. Apparatus for indicating the course of a vessel, comprising an indicating device, independent mechanisms for driving the indicating device in two mutually perpendicular directions across a chart, electric motors for driving said mechanisms and rheostats for controlling the motors according to the speed and direction of the vessel and of prevalent tides, currents and winds.

2. Apparatus for indicating the course of a vessel, comprising an indicating device, independent mechanisms for driving the indicating device in two mutually perpendicular directions across a chart, electric motors for driving said mechanisms, a rheostat for controlling the motors according to the direction of the vessel, a compass-needle supported above the center of the rheostat and an arcuate scale supported on the arm of the rheostat for the purposes hereinbefore set forth.

3. Apparatus for indicating the course of a vessel, comprising an indicating device, independent mechanisms for driving the indicating device in two mutually perpendicular directions, two electric motors and differential gear for driving said mechanisms, a rheostat for controlling the motors according to the direction of the vessel, a compass-needle pivoted centrally above the rheostat, and an arcuate scale upon the arm of the rheostat, for the purpose hereinbefore described.

4. Apparatus for indicating the course of a vessel, comprising an indicating device, independent mechanisms for driving the indicating device in two mutually perpendicular directions, two electric motors and differential gear for driving said mechanisms, a rheostat for controlling the motors according to the direction of the vessel, a compass-needle pivoted centrally above the rheostat, and an arcuate scale upon the arm of the rheostat, the needle carrying a mirror adapted to reflect a spot of light upon the scale for the purpose hereinbefore described.

5. Apparatus for indicating the course of a vessel, comprising an indicating device, independent mechanisms for driving the indicating device in two mutually perpendicular directions, two electric motors and differential gear for driving said mechanisms, a rheostat for controlling the motors according to the direction of the vessel, a compass-needle pivoted centrally above the rheostat, and an arcuate scale upon the arm of the rheostat, the arm having a lamp and the needle having a mirror for reflecting a pencil of light onto the scale, for the purpose hereinbefore set forth.

6. Apparatus for indicating the course of a vessel, comprising an indicating device, independent mechanisms for driving the indicating device in two mutually perpendicular directions, two electric motors and differential gear for driving said mechanisms, a rheostat for controlling the motors according to the direction of the vessel, a compass-needle pivoted centrally above the rheostat, and an arcuate scale upon the arm of the rheostat, the arm having a lamp and the needle having a mirror for reflecting a pencil of light onto the scale; and other rheostats for controlling the motors according to the speed of the vessel, and to the speed and direction of prevalent tides, currents or winds.

7. Apparatus for indicating the course of a vessel, comprising an indicating device, independent mechanisms for driving the indicating device in two mutually perpendicular directions across a chart, electric motors for actuating said mechanisms, and a rheostat for controlling the motors according to the direction of the vessel.

8. In a device of the character described, the combination with a rheostat including an arm, of a lamp and scale carried by the arm, a compass-spindle, and a reflector carried by the compass-spindle and coacting with said lamp to display a pencil of light on said scale.

In witness whereof I have hereunto set my hand in presence of two witnesses.

HAROLD EDWARD SHERWIN HOLT.

Witnesses:
BERTRAM H. T. MATTHEWS,
WALTER E. ROCHE.